United States Patent [19]
Luscombe

[11] Patent Number: 5,390,715
[45] Date of Patent: Feb. 21, 1995

[54] TREE PRUNING APPARATUS

[76] Inventor: Terry L. Luscombe, RR 1, Armstrong, Iowa 50514

[21] Appl. No.: 237,721

[22] Filed: May 3, 1994

[51] Int. Cl.⁶ .................... A01G 23/08; B77L 1/00
[52] U.S. Cl. .................... 144/2 Z; 144/3 D; 144/34 R; 144/338; 144/343
[58] Field of Search .......... 144/2 Z, 3 D, 34 R, 144/336, 338, 343; 83/928; 30/379.5

[56] References Cited

U.S. PATENT DOCUMENTS

| | | | |
|---|---|---|---|
| 3,389,728 | 6/1968 | Galis | 144/34 R |
| 3,451,448 | 6/1969 | Michenor | 144/2 Z |
| 3,604,479 | 9/1971 | Jordan | 143/332 |
| 3,885,610 | 5/1975 | Foslund et al. | 144/34 R |
| 3,991,799 | 11/1976 | Albright | 144/34 R |
| 4,063,359 | 12/1979 | Luscombe | 30/379.5 |
| 4,269,241 | 5/1981 | Hickman | 144/22 |
| 4,416,311 | 11/1983 | Gemmell-Murdoch | 144/2 Z |
| 4,522,239 | 6/1985 | Gaitten | 144/2 Z |
| 4,569,379 | 2/1986 | Gemmell-Murdoch | 144/343 |
| 4,981,163 | 1/1991 | Westlund | 144/3 D |
| 5,201,350 | 4/1993 | Milbourn | 144/343 |

Primary Examiner—W. Donald Bray
Attorney, Agent, or Firm—Herman H. Bains

[57] ABSTRACT

An apparatus for cutting and pruning trees is attachable to the end of the outermost boom arm of a vehicle mounted boom assembly. The apparatus includes a grapple and saw assembly comprising a grapple and saw assembly frame having a grapple is mounted thereon. A first positioning hydraulic motor is interconnected with the grapple and saw assembly to the outermost boom arm for pivoting the grapple and saw assembly about a first axis. A second positioning hydraulic motor is disposed between and interconnected with the grapple and saw assembly and first positioning motor for pivoting the grapple and saw assembly through an arc of 360° about an axis disposed substantially normal to said first pivotal axis. A saw assembly is mounted on the grapple and saw assembly frame by a third positioning hydraulic motor for pivoting the saw assembly through an arc of 360° about an axis disposed substantially normal to said first and second pivotal axes.

6 Claims, 2 Drawing Sheets

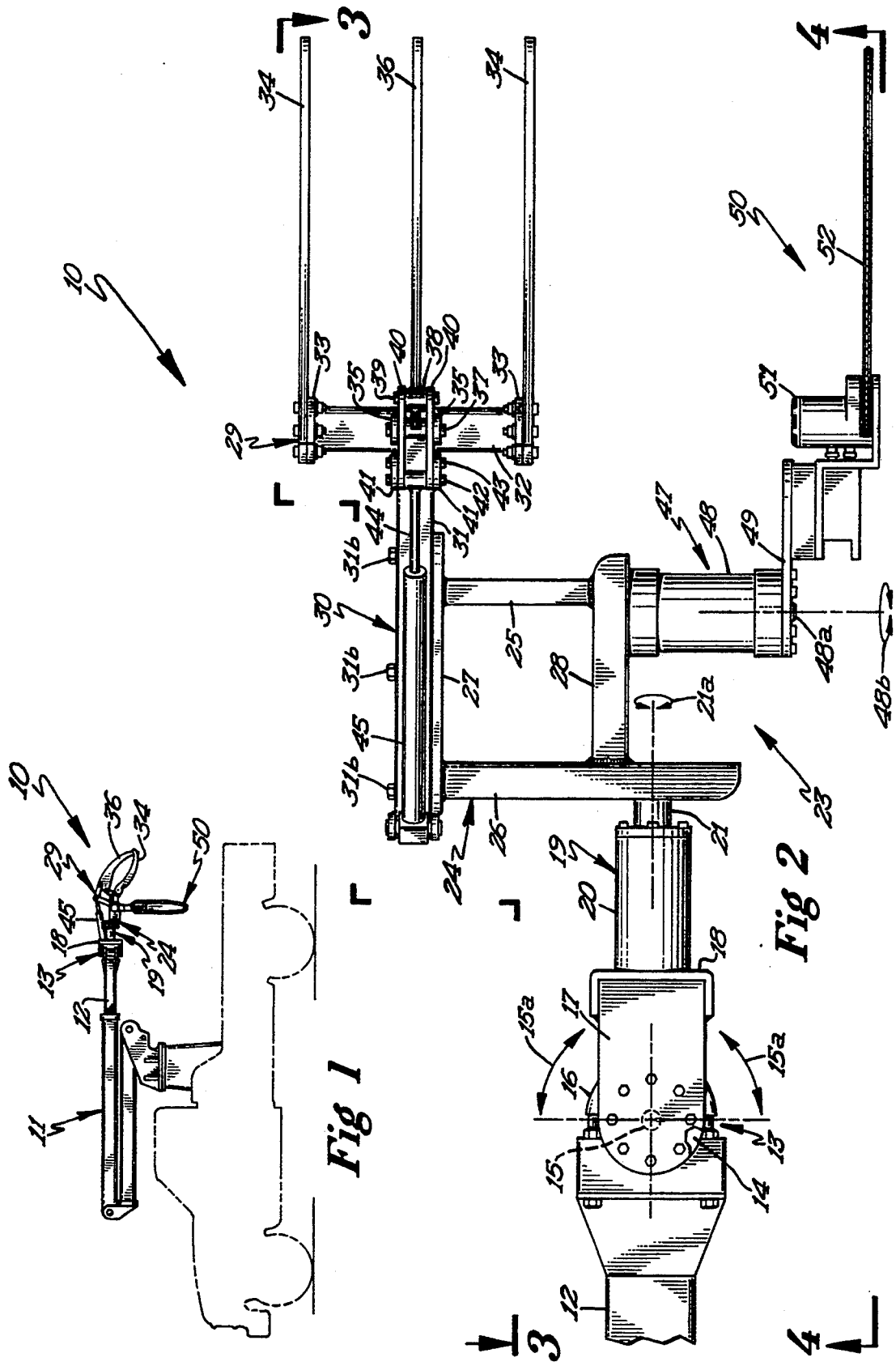

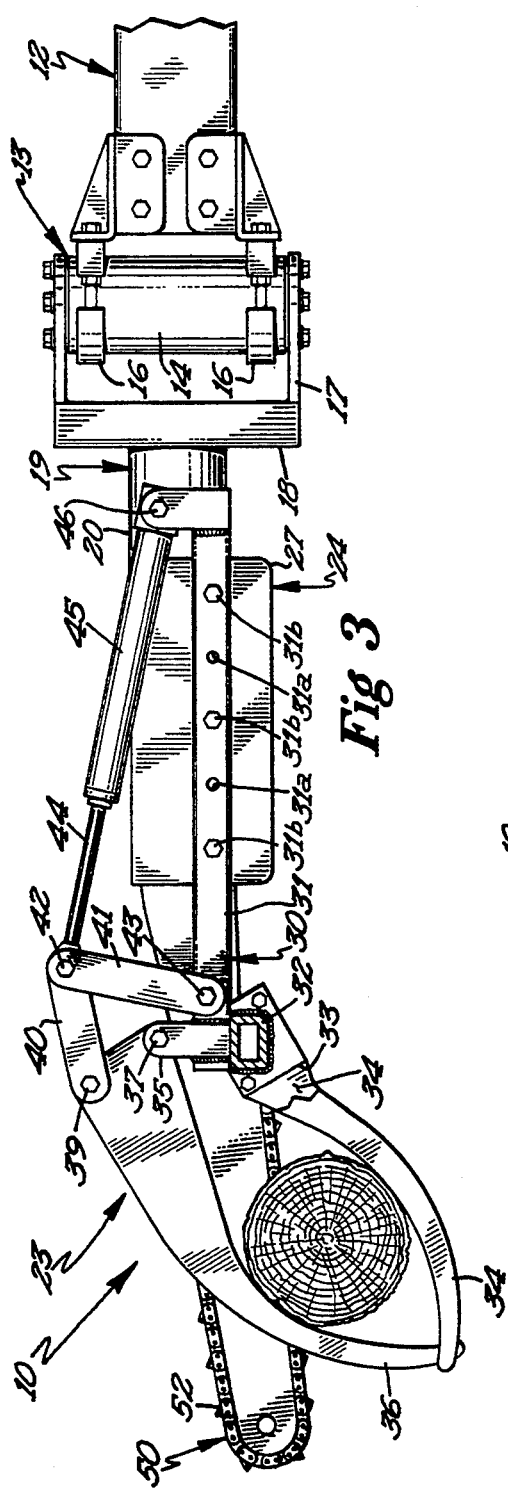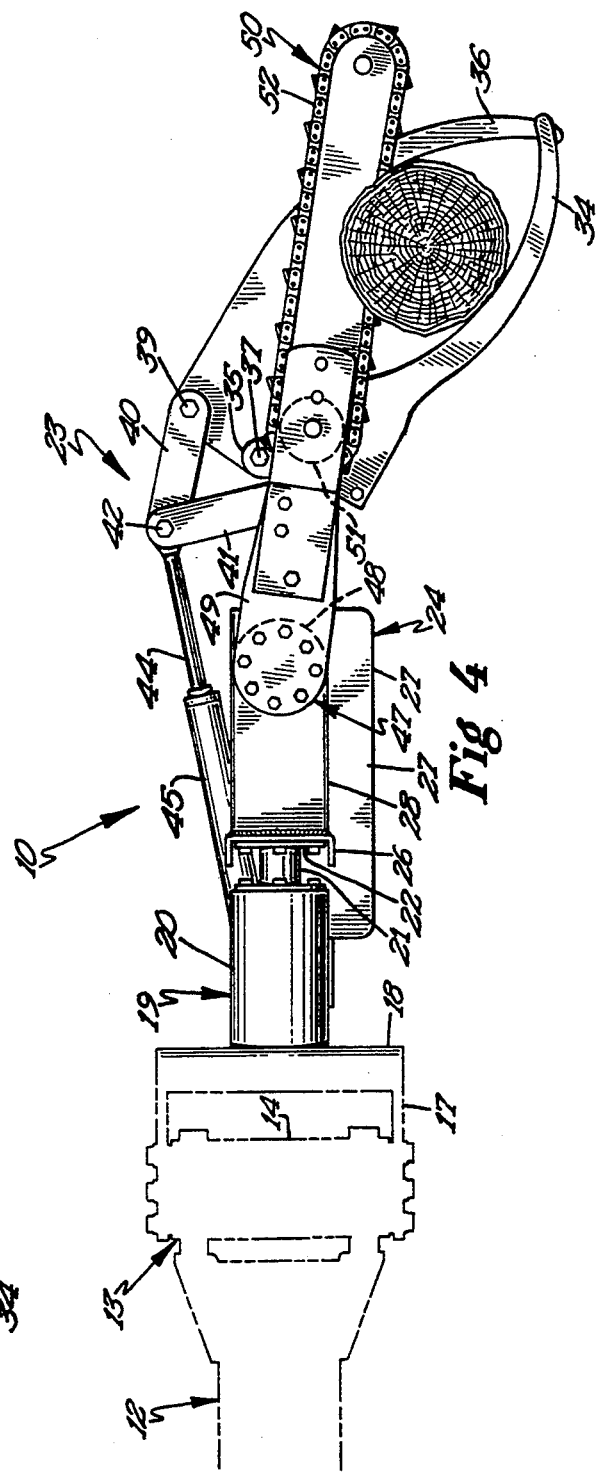

TREE PRUNING APPARATUS

BACKGROUND OF THE INVENTION

FIELD OF THE INVENTION

This invention relates to an apparatus for cutting and pruning trees and more specifically to an articulated apparatus for cutting and pruning trees which is adjustable about a plurality of axes.

PRIOR ART

Various types of apparatus have been developed for cutting and/or pruning trees. Such apparatus are usually mounted on an articulated boom assembly and are controlled by an operator from adjacent the ground level. In some of these prior art devices, there is some range of adjustment of the cutting or pruning device independent of the boom assembly. Because of the location of the limbs and their angle relative to the tree trunk, the cutting and pruning device must be adjustable or the vehicle carrying the boom assembly must be moved periodically.

For example, U.S. Pat. No. 4,269,241 discloses a boom mounted adjustable limb cutting device including a rotary saw blade mounted adjacent the end of the boom and adjacent the V-shaped guide member. The cutting device is longitudinally extensible and retractable relative to the boom and is also rotatable about a longitudinal axis by motor driven chain and sprocket assembly.

U.S. Pat. No. 3,451,448 discloses a tree pruning apparatus including a chain saw which is adjusted relative to its power source, a tiltable internal combustion engine. The entire apparatus is capable of movement in a helical fashion around a tree trunk.

U.S. Pat. No. 5,201,350 discloses a work head which is mountable on the boom of an apparatus for cutting trees and bushes. The work head includes a chain saw which is movable about a vertical axis and it also includes a circular saw.

U.S. Pat. No. 3,389,728 discloses a tree harvester machine which includes a clamp assembly for engaging the trunk of the tree to be cut and a tree cutting saw assembly. The tree clamp and tree saw assemblies are each mounted on separate booms. The tree cutting saw assembly is adjustable about a pair of axes.

U.S. Pat. No. 3,885,610 shows a tree harvesting device including a gripping assembly and a chain saw cutting assembly. The cutting assembly has some range of adjustment about a single axis.

U.S. Pat. No. 3,991,799 discloses a tree felling apparatus including a tree stabilizer device for engaging the tree trunk and a chain saw for cutting the tree after it has been stabilized and gripped.

U.S. Pat. Nos. 3,604,479 and 4,981,163 also disclose tree cutting devices.

SUMMARY OF THE INVENTION

It is an object of this invention to provide a novel tree cutting and pruning apparatus mounted on a boom assembly and including a grapple and saw assembly and separate positioning mechanisms which are independently operable for positioning the power saw.

The apparatus includes interconnected first and second positioning rotary motors whose output shafts are disposed normal to each other. A grapple and saw assembly is connected to the output shaft of the second positioning rotary motor, and this assembly includes a grapple for gripping a tree or limb during the cutting or pruning operation. A third positioning rotary motor is mounted on the frame of the grapple and saw assembly and is connected to a power driven saw. The grapple is adjustable about a pair of axes while the power driven saw is adjustable about three separate positioning axes. This arrangement permits a wide range of adjustability of the tree cutting and pruning apparatus while minimizing any need to move the vehicle which supports the boom assembly.

BRIEF DESCRIPTION OF THE FIGURES OF THE DRAWING

FIG. 1 is a diagrammatic view of the boom assembly illustrating the manner in which the tree cutting and pruning apparatus is attached thereto.

FIG. 2 is a top elevational view of the tree cutting and pruning apparatus;

FIG. 3 is a side elevational view of the tree cutting and pruning apparatus viewing the apparatus from one side and;

FIG. 4 is a side elevational view of the apparatus similar to FIG. 2 but viewing the apparatus from the opposite side of FIG. 2 and;

DESCRIPTION OF THE PREFERRED EMBODIMENT

Referring now to the drawings, it will be seen that one embodiment of the novel cutting and pruning apparatus, designated generally by the reference numeral 10, is secured to the outer end of the outer boom arm 12 of a vehicle mounted boom assembly 11. Controls for operating the cutting and pruning apparatus 10 are located at the vehicle. The outer boom arm 12 is extensible and retractable, and boom assembly is pivotally articulate and rotatable in a well-known conventional manner.

A cutting and pruning apparatus 10 includes a first positioning mechanism 13 which is comprised of a first reversible rotary hydraulic motor 14 having an output shaft 15 which is disposed in a plane which is substantially normal to the longitudinal axis of the outer boom arm 12. The rotational axis 15a of the output shaft 15 will be disposed substantially vertical to the ground surface when the boom arm 12 is in a horizontal position. A pair of U-shaped bolt and strap assemblies 16 detachably secure the rotary hydraulic motor 14 to the outer end of the outer boom arm 12.

A U-shaped frame member 17 is secured to the output shaft 15 of the rotary hydraulic motor 14 and a second U-shaped frame 18 is rigidly secured to the U-shaped frame 17. A second positioning mechanism 19 is mounted on the U-shaped frame 18 and includes a second reversible rotary hydraulic motor 20. The second rotary hydraulic motor 20 includes an output shaft 21 whose rotational axis 21a is disposed substantially normal to the rotational axis 15a of the output shaft 15. The outer end of the output shaft 21 is rigidly secured to an attachment plate 22.

A grapple and saw assembly 23 includes a grapple and saw assembly frame 24 which is rigidly secured to the attachment plate 22. It will therefore be seen that when the output shaft 21 of the rotary hydraulic motor 20 is rotated, the grapple and saw assembly 23 will accordingly be rotated. The grapple and saw assembly frame 24 includes a front transverse frame member 25, a rear transverse frame member 26 and a pair of longitudinal frame members 27, 28. The longitudinal frame members 27, 28 are rigidly secured to the transverse frame members to thereby define a generally rectangular shaped frame.

The grapple and saw assembly 23 includes a grapple assembly 29 comprised of a grapple frame 30. The grapple frame 30 includes an elongate longitudinal frame member 31 having a plurality of openings 31a therein for accommodating bolts 31b which secure the frame member 31 to the longitudinal frame member 27 of the frame 24. It will therefore be noted that the grapple frame is longitudinally adjustable relative to the grapple and saw assembly frame 24.

An elongate transverse frame member 32 is rigidly affixed to the front end of the longitudinal frame member 31, as best seen in FIG. 2. The transverse frame member 32 has a pair of upstanding ears rigidly secured at the ends thereof and these ears have a pair of fixed grapple members 34 fixedly secured thereto. It will be noted that the fixed grapple members 34 are curved to present an upwardly concave gripping surface.

The transverse frame member 32 of the grapple frame 30 also has a pair of spaced apart ears 35 secured thereto adjacent the mid-portion thereof and projecting upwardly therefrom. These ears 35 are suitably apertured and accommodate the inner end of an elongate movable grapple member 36 by means of a pivot 37. It will be noted that the movable grapple member 36 is curved and presents a downwardly concave gripping surface for gripping trees, limbs or other articles to be cut. It will further be noted that the movable grapple member 36 is spaced equidistant between and from the fixed grapple members 34.

A transversely extending sleeve 38 is integrally formed with the upper portion of the movable grapple member 36 adjacent the rear end portion thereof and the sleeve accommodates a pivot pin 39 which projects therethrough and through the apertured ends of a pair of toggle links 40. The other ends of the toggle links 40 are pivoted to the ends of a second pair of toggle links 41 by means of a pivot 42. The lower end of each toggle link 41 is pivotally connected to the front end of the longitudinal frame member 31 of the grapple frame 30. The pivot 42 also projects through the outer end of a piston rod 44 for a double acting hydralic cylinder 45.

The rear end portion of the hydraulic cylinder 45 is pivotally connected to the rear upturned end of the elongate frame member 31 by means of a pivot 46. With this arrangement, it will be seen that by retraction and extension of the double acting hydraulic cylinder 45 and piston rod 44, the movable grapple member 36 may be shifted between open and closed positions. In FIGS. 3 and 4, the movable grapple member is illustrated in the closed position and cooperates with the fixed grapple members to grip a limb therebetween.

The grapple and saw assembly frame 24 has a third positioning mechanism 47 mounted thereon and includes a third reversible rotary hydraulic motor 48 having an output shaft 48a whose rotational axis 48b is disposed substantially normal to the rotational axis 21a for the motor 20 and substantially normal to the rotational axis of the motor 14. The output shaft 48 is secured to a plate 49 to which is attached a saw assembly 50. The saw assembly 50 includes a chain saw hydraulic motor 51 and a chain saw 52 secured to the output shaft of the motor 51. The positioning mechanism permits the saw assembly to rotate through an arc of 360° independently of the movement of the grapple assembly.

During operation of the apparatus, the operator will manipulate the controls from the ground and will be able to accurately cut and prune trees without moving the vehicle which supports the boom assembly. By energizing the first reversible rotary hydraulic motor 14, the entire apparatus may be swung in either direction laterally through an arc of approximately 270°. This permits a wide range of lateral positions for the apparatus. The entire grapple and saw assembly may be rotated through an arc 360° by means of the positioning hydraulic motor 20. This allows the position of the grapple and saw to have the widest possible range of adjustments with respect to a generally longitudinal axis. For example, grapple assembly 29 may be positioned above the saw assembly 50 or vice versa. The lateral positions may also be readily reversed so that the angular relationship of the saw and grapple assembly may adjusted to accommodate any limb regardless of its disposition.

The third positioning motor 48 permits the saw assembly to be adjusted independently of the grapple assembly and allows the saw assembly to be repositioned relative to the grapple and saw assembly frame through an arc of 360°. Since the boom assembly is articulated and extensible, the saw assembly may be positioned for pruning on the side of the trunk opposite that of the operator. With this arrangement, the apparatus does not require that the vehicle, which supports the boom assembly, be repositioned for cutting and pruning limbs which were inaccessible from a first vehicle position. Sometimes movement of the vehicle is limited by the local conditions, but the extensive adjustability of the cutting and pruning apparatus is not limited by such conditions.

Thus it will be seen that I have provided a novel cutting and pruning apparatus which, because of its wide range of adjustability, permits effective pruning and cutting a tree without requiring repositioning of the vehicle carrying the boom assembly.

What is claimed is:

1. An apparatus for cutting and pruning trees attachable to the end of the outermost boom arm of a vehicle mounted, articulated and extensible boom assembly, comprising;

a grapple and saw assembly including a grapple and saw assembly frame, a grapple assembly mounted on said frame for gripping trees and limbs;

power operated first positioning means interconnected with said grapple and saw assembly, means for securing said first positioning means to the end of the outermost boom arm, said first positioning means being operable to pivot said grapple and saw assembly relative to the outermost boom arm through an arc of at least 180° about a first pivot axis, power operated second positioning means interposed between and connected with said first positioning means and said grapple and saw assembly, said second positioning means being operable to rotate said grapple and saw assembly relative to said first positioning means through an arc of 360° about a second pivot axis, the rotational axis of said second positioning means being disposed substantially normal to said first pivot axis, a power driven saw assembly, power operated third positioning means mounting said saw assembly on said grapple and saw assembly frame, said third positioning means being operable to rotate said saw assembly relative to said grapple and said saw assembly frame through an arc of 360° about a third pivot axis, said third axis being disposed substantially normal to said first and second axes.

2. The apparatus as defined in claim 1 wherein said first, second and third positioning means each comprises a reversible rotary hydraulic motor, each motor having an output shaft defining the pivot axis of the positioning means.

3. The apparatus as defined in claim 1 wherein said grapple assembly includes grapple frame, means securing said grapple frame to said grapple and saw assembly frame for longitudinal adjustment of the grapple frame relative to said grapple and saw assembly frame, a pair of fixed grapple members secured to said grapple frame, a moveable grapple member pivotally mounted on said grapple frame for movement of the movable grapple member between open and closed positions, and means for shifting said moveable grapple member between open and closed positions.

4. The apparatus as defined in claim 2 wherein said first pivotal axis is disposed substantially vertical when the outermost boom arm is in a horizontal position.

5. The apparatus as defined in claim 2 wherein said rotary hydraulic motor is operable to pivot said grapple and saw assembly through an arc of approximately 270°.

6. An apparatus for cutting and pruning trees attachable to the end of the outermost boom arm of a vehicle mounted, articulated and extensible boom assembly, comprising;

a first positioning mechanism including a first reversible rotary motor having an output shaft, means for securing mechanism to the end of the outermost boom, the axis of rotation of the motor being disposed substantially normal to the longitudinal axis of the outermost boom and substantially vertical when the outermost boom arm is in the horizontal position, a frame secured to the output shaft and being swingable in a generally lateral direction when the rotary motor is energized, a second positioning mechanism including a second reversible rotary motor having an output shaft whose axis of rotation is disposed substantially normal to the rotational axis of the output shaft of the first rotary motor, a grapple and saw assembly including a grapple and saw assembly frame secured to the output shaft of the second rotary motor, a grapple mounted on said grapple and saw assembly frame for gripping tree trunks, limbs, and similar structures to be cut, said grapple including a grapple frame having a pair of fixed grapple members secured thereto, a movable grapple member pivoted on said grapple frame and cooperating with the fixed grapple members to grip the article to be cut, a third positioning mechanism including a reversible rotary motor mounted on said grapple and saw assembly frame having an output shaft whose axis of rotation is disposed substantially normal to the rotational of said first and second axes, and a power driven saw device, means mounting said saw device on said grapple and saw assembly frame.

* * * * *